United States Patent
Yoshioka et al.

[19]

[11] Patent Number: 5,946,820
[45] Date of Patent: Sep. 7, 1999

[54] APPARATUS AND METHOD FOR CONTINUOUSLY GRANULATING POWDER MATERIAL

[75] Inventors: Kazuo Yoshioka; Masakazu Yoshizawa; Masahiro Fukazawa, all of Kawasaki, Japan

[73] Assignees: Knorr Foods Co., Ltd., Kawasaki; Ajinomoto Co., Inc., Tokyo, both of Japan

[21] Appl. No.: 08/783,057

[22] Filed: Jan. 14, 1997

[51] Int. Cl.⁶ ............................................. F26B 17/00
[52] U.S. Cl. .................................................. 34/588
[58] Field of Search .......................... 34/576, 580, 586, 34/588, 589

[56] References Cited

U.S. PATENT DOCUMENTS

| | | | |
|---|---|---|---|
| 2,586,818 | 8/1952 | Harms | 259/4 |
| 3,715,216 | 2/1973 | Wuhrmann et al. | 99/78 |
| 4,318,932 | 3/1982 | Ewing et al. | 426/285 |
| 4,591,324 | 5/1986 | Kubota | 425/222 |
| 4,832,700 | 5/1989 | Kasper et al. | 23/313 |

FOREIGN PATENT DOCUMENTS

| | | |
|---|---|---|
| 214714 | 3/1987 | European Pat. Off. . |
| 289074 | 11/1988 | European Pat. Off. . |
| 3705343 | 9/1987 | Germany . |
| 62-247833 | 10/1987 | Japan . |
| 1401304 | 7/1975 | United Kingdom . |

OTHER PUBLICATIONS

Nielsen, F. et al, "Herstellung Staubarmer, Freifliessender Produkte", Chemietechnik, vol. 22, No. 10, Oct. 1, 1993, pp. 48 and 49.

*Primary Examiner*—Henry Bennett
*Assistant Examiner*—Malik N. Drake
*Attorney, Agent, or Firm*—Jacobson, Price, Holman & Stern, PLLC

[57] ABSTRACT

An apparatus for continuously granulating powder material has a feeder for continuously supplying powder material, and a granulation vessel. The granulation vessel includes a granulation zone and a drying zone. The apparatus also has a spray nozzle disposed so as to be declined above the granulation zone for adding binder to the powder material, a perforated plate disposed below the granulation zone and the trying zone, an intermediate weir disposed between the granulation zone and the drying zone so as to provide a space between the intermediate weir and the perforated plate, an outlet weir disposed at an outlet side of the drying zone, and a heated air supplying device for supplying from below heated air to the granulation zone and the drying zone so as to form a fluidized bed of the material.

8 Claims, 5 Drawing Sheets

APPARATUS AND METHOD FOR CONTINUOUSLY GRANULATING POWDER MATERIAL

BACKGROUND OF THE INVENTION

1. Field of the Invention

The present invention relates to an apparatus and a method for continuously granulating powder material, in particular to an apparatus and a method for granulating powder material used in the food processing field.

2. Description of the Related Art

In the food processing field, there is known a continuous granulation method such as an agitating granulation method, a tumbling granulation method, a continuous vibration fluidized bed method and the like, and a batchwise fluidized bed granulation method, for granulating powder material.

The continuous vibration fluidized bed method is disclosed in Japanese Patent Laid-Open No. 62-247833. In this method, powder material is continuously dropped to form a uniform powder layer having a predetermined thickness. Pressured mist water is then added to the upper surface of the powder layer and thereafter the powder material is forced to move by a vibration mechanism and thus granulated.

However, the conventional continuous granulation method forms for example a high density powder layer of the material, and the granules of the material become hard. Therefore, it has been difficult to obtain the granules which are porous and have a good instant characteristic by the above-mentioned conventional continuous granulation method. A good instant characteristic means that the granules are easy to disperse and to solve when adding boiled water thereto.

The granules having a good instant characteristic can be obtained by the conventional batchwise fluidized bed granulation method. However, since the batchwise fluidized bed granulation method employs a batch operation, the batchwise fluidized bed granulation method needs labors of a relatively high numbers and therefore the labor productivity is low.

Further, in the conventional method disclosed in the above Japanese patent, it is difficult to obtain granules having a good instant characteristic, since the granules are hard, and thus use of the vibration mechanism for moving the powder layer by force is necessary.

SUMMARY OF THE INVENTION

It is therefore an object of the present invention to provide an improved apparatus and a method for continuously granulating power.

It is another object of the present invention to provide an apparatus and a method which can continuously produce granules which are porous and have a good instant characteristic by using a relatively simple mechanism.

These and other objects are achieved according to the present invention by providing an apparatus for continuously granulating power material comprising, feeder means for continuously supplying powder material, a granulation vessel including a granulation zone in which the continuously supplied powder material is granulated, and a drying zone in which the granulated material is dried, said granulation vessel having side walls which are inclined at a predetermined angle so that an opening area thereof becomes larger toward its top end, a spray nozzle disposed above the granulation zone for adding binder to the powder material, a perforated plate disposed below the granulation zone and the drying zone, the perforated plate having a predetermined opening ratio, an intermediate weir disposed substantially vertically between the granulation zone and the drying zone so as to provide a space having a predetermined height between the intermediate weir and the perforated plate, an outlet weir disposed at an outlet side of the drying zone, the outlet weir having a predetermined height the dried granulated material overflows, and heated air supplying means for supplying from below heated air having a predetermined temperature to the granulation zone and the drying zone so as to form a fluidized bed of the material.

According to another aspect of the present invention, an apparatus for continuously granulating power material comprises feeder means for continuously supplying powder material, a granulation vessel for granulating the continuously supplied powder material, said granulation vessel having side walls which are inclined at a predetermined angle so that an opening area thereof becomes larger toward its top end, a spray nozzle disposed in an upper portion in the granulation vessel for adding binder to the powder material, a perforated plate disposed below the granulation vessel, the perforated plate having a predetermined opening ratio, and heated air supplying means for supplying from below heated air having a predetermined temperature from the below to the granulation vessel so as to form a fluidized bed of the material.

According to still another aspect of the present invention, a method for continuously granulating powder material comprises the steps of agitating and mixing powder material, continuously supplying the agitated and mixed powder material to a granulation vessel which includes a granulation zone and a drying zone, said granulation vessel having side walls which are inclined at a predetermined angle so that an opening area thereof becomes larger toward its top end, forming a fulidized bed in the granulation zone and the drying zone by letting heated air having a predetermined temperature flow upwardly through a perforated plate disposed below the granulation zone and the drying zone, adding binder to the powder material in the fluidized bed in the granulation zone by a spray nozzle disposed above the granulation zone so that the powder material is granulated, moving the granulated material by a piston flow from the granulation zone to the drying zone through a space having a predetermined height, the space being provided between the perforated plate and an intermediate weir which is disposed substantially vertically between the granulation zone and the drying zone, drying the granulated material in the drying zone by using the heated air, and discharging the dried granulated material to outside of the granulation vessel by letting the material overflow an outlet weir having a predetermined height and being disposed at an outlet side of the drying zone.

The above and other objects and features of the present invention will be apparent from the following description by taking reference with accompanying drawings employed for preferred embodiments of the present invention.

DESCRIPTION OF THE PREFERRED EMBODIMENTS

The present invention will now be explained with reference to preferred embodiments and the drawings.

An embodiment of the present invention will be explained with reference to FIGS. 1–5.

Figure 1:
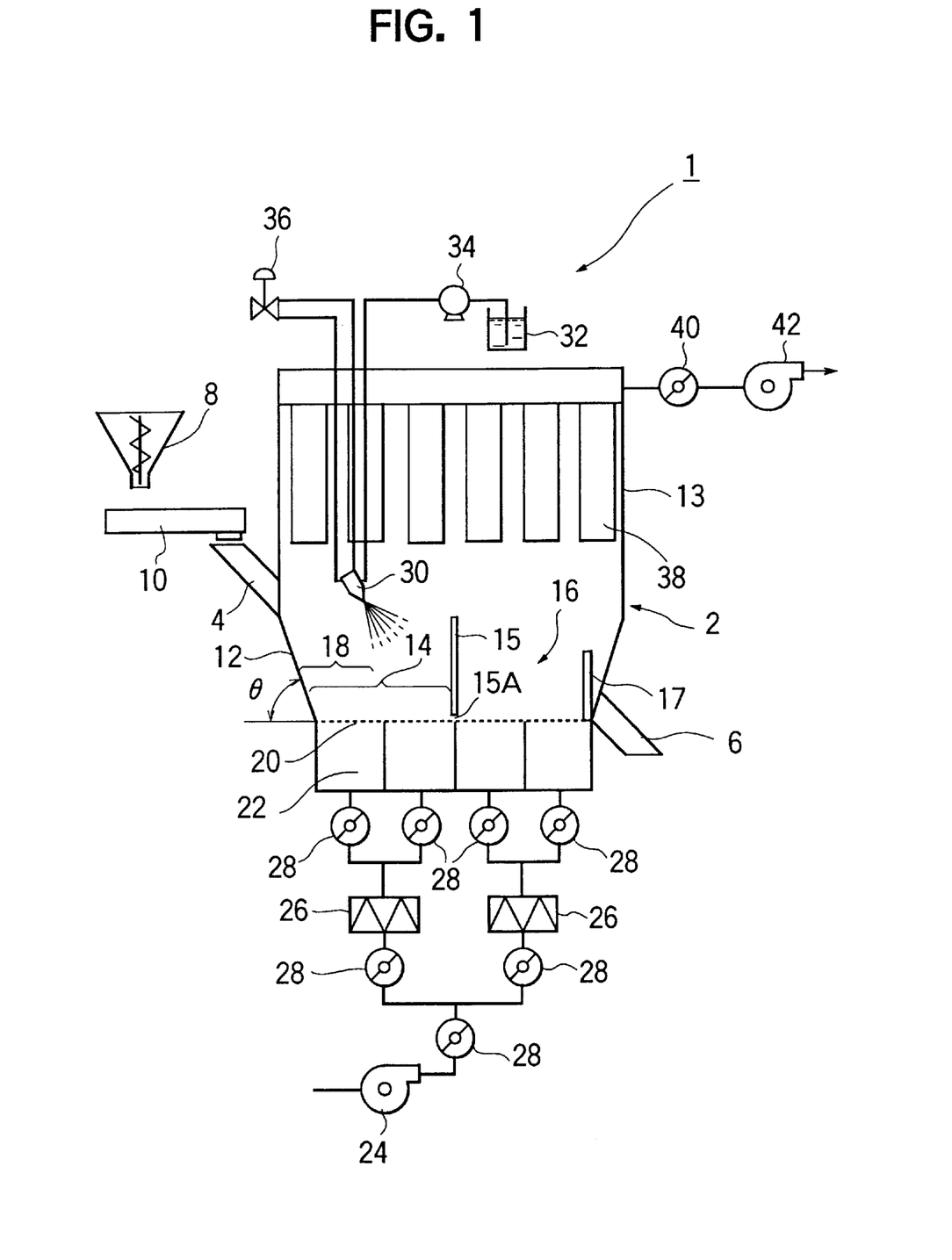
FIG. 1 is a sectional front view of an apparatus for continuously granulating powder material according to an embodiment of the present invention.

FIG. 1 is a sectional front view of an apparatus for continuously granulating powder material according to an embodiment of the present invention. As shown in FIG. 1, reference numeral 1 designates an apparatus for continuously granulating powder material which includes a granulation vessel 2. The granulation vessel 2 comprises a material dumping port 4 provided on an upper portion of one end (the left side in FIG. 1) of the granulation vessel 2 and a granule discharge port 6 provided on a lower portion of the other end (the right side in FIG. 1) of the vessel 2. A material feeder 8 for constantly supplying powder material and a conveyor 10 are respectively disposed at an upstream side of the material dumping port 4.

The powder material employed in the apparatus is material used for various kinds of soups, stews, sauces and the like, and a typical example of the material is that for potage soup such as corn cream soup. The powder material contains various kinds of materials, for example, wheat flour of about 5–35 weight percent, starch of 10–30 weight percent, common salt of 0–12 weight percent, edible fats and oils of 0–30 weight percent. The diameters of the particles of respective materials contained in the powder material are 10–500 micrometers. The powder material used in the embodiment of the invention contains corn powder of 35 weight percent, dried milk of 10 weight percent, milk sugar of 15 weight percent, starch of 10 weight percent, sugar of 4 weight percent, liquid fat of 7 weight percent and common salt of 4 weight percent. The liquid fats are, as explained below, edible fats and oils which are separately added to the powder material in a mixer (not shown) or a granulation zone of the vessel. The melting point of the edible fats and oils is 35–45° C. The edible fats and oils are used after being heated and dissolved at a temperature of equal to or more than 60° C.

After agitating and mixing the powder material in a mixer (not shown) for about five minutes while adding edible oil and fat into the powder material, the material feeder 8 continuously supplies constant amount of the mixed powder material with the edible fats and oils into the granulation vessel 2 through the material dumping port 4.

The granulation vessel 2 includes a conical portion 12 at a lower portion thereof. The conical portion 12 has a so-called bathtub type structure whose sectional has an inverted trapezoid shape, and side walls thereof are inclined at a predetermined angle θ (θ=70 degrees) from a horizontal direction so that the opening area of the conical portion 12 becomes gradually larger toward its top end. The predetermined angle θ of the conical portion 12 is preferably about 60–80 degrees from a horizontal direction. The granulation vessel 2 further includes a straight body portion 13 in which the size of the opening area in the vertical direction remains constant.

The granulation vessel 2 includes a granulation zone 14 for granulating the supplied powder material and a drying zone 16 for drying the granulated material. The granulation zone 14 includes a premixing zone 18 at the side of the material dumping port 4. The granulation zone 14 and the drying zone 16 are divided by an intermediate weir 15 which is disposed above a perforated plate 20 so as to provide a space 15A having a predetermined height between the intermediate weir 15 and the perforated plate 20. The intermediate weir 15 is a plate type one and is disposed vertically. The height of the space 15A between the perforated plate 20 and the intermediate weir 15 is preferably 10–50 millimeters. An outlet weir 17 is disposed near the granule discharge port 6 in the drying zone 16. The height of the outlet weir 17 is preferably 150–300 millimeters and can be varied.

Figure 2A:
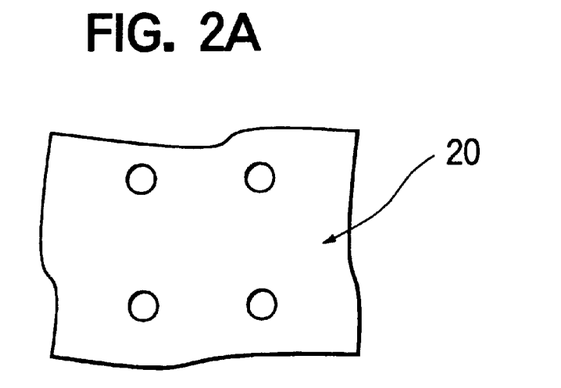
FIG. 2A is a plan view and FIG. 2B is a sectional view of a punching plate which is employed as a perforated plate in the embodiment of the present invention.
Figure 2B:
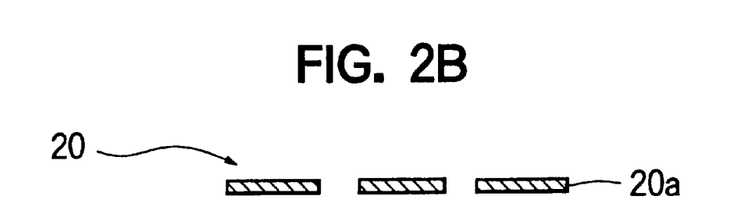

The perforated plate 20 is disposed below the granulation zone 14 and the drying zone 16 so as to make the air flow uniform and make it difficult to clog the plate 20. Thus, the perforated plate 20 enables a well fluidized powder material to be obtained in the granulation zone 14 and the drying zone 16. The perforated plate 20 is, as shown in FIG. 2, preferably a punching plate 20a which has an opening area ratio of 4 percent (preferably about 3–7 percent) and diameters of openings (see FIG. 2A) in the punching plate 20a are about 1.0–2.0 millimeters.

Four chambers 22 are disposed below the perforated plate 20 and heated air is introduced into these chambers 22 from the outside. Outside air is introduced by the intake air blower 24 and is heated up to a predetermined temperature by the steam heaters 26, and amount of the air flowing into the chambers 22 is adjusted by the flow regulating valves 28. Thus, the temperature and the amount of the air flowing into the chambers 22 are controlled.

A spray nozzle 30 is disposed above the granulation zone 14 of the granulation vessel 2. The spray nozzle 30 is attached to be declined downwardly at an angle of preferably about 30 degrees from the vertical direction. The spray nozzle 30 may be disposed vertically toward below. Namely, the spray nozzle may be disposed at an angle of about 0–30 degrees from the vertical direction. Binder, namely water or hot water dissolved potato starch, is stored in a binder vessel 32 which is disposed outside of the granulation vessel 2, the binder being supplied through a pump 34 to the spray nozzle 30. Mist air is also supplied through a pressure reducing valve 36 to the spray nozzle 30 from a compressed air source (not shown) disposed outside of the granulation vessel 2. The binder is made fine by the spray nozzle 30 and is added to the powder material in the granulation zone 14. The spray nozzle 30 is operated under the following conditions. That is, the amount of the binder is 10–22 weight percent of the supplied powder material, the pressure of the mist air is 2–3.5 Kgf/cm2G, and the spraying angle is about 30–60 degrees. Under these operational conditions, the binder having droplets with respective diameters of 10–50 micrometers is continuously injected from the spray nozzle 30.

Further, a bag filter 38 is disposed above the granulation zone 14 and the drying zone 16 of the granulation vessel 2. The bag filter 38, which traps the scattered powder material, is connected with a valve 40 and an exhaust blower 42, both of which are disposed outside of the granulation vessel 2.

An operation of the apparatus for continuously granulating powder material 1 will be explained below.

Figure 3A:
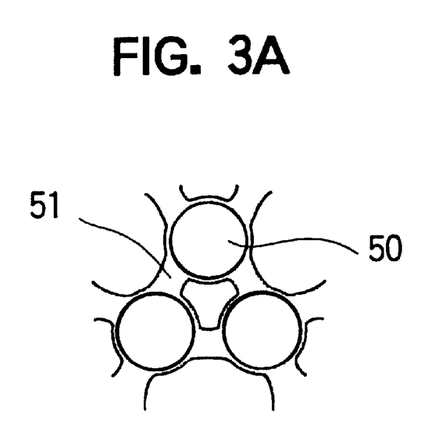
FIGS. 3A–3B are an enlarged views showing powder particles.
Figure 3B:
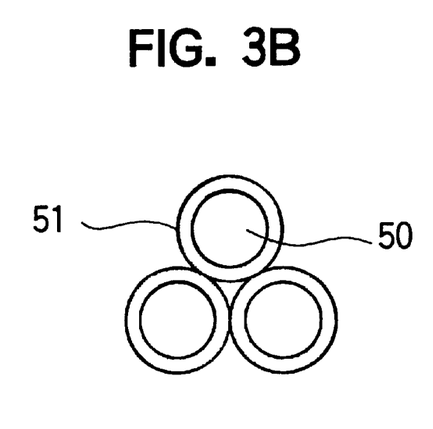

First, a predetermined amount of powder material is agitated and mixed for about five minutes by the mixer (not shown) while adding the edible fats and oils to the powder material. Thus, the surface of powder particles of the powder material becomes hydrophobic, and therefore the surface of the powder particles is not rapidly made wet by the binder liquid so that the amount of binder liquid 51 working as a bridge between two powder particles of the powder material become relatively large. As a result, many more porous granules of the powder material can be obtained according to the embodiment of the invention than by the above-mentioned conventional apparatus. FIG. 3A shows powder particles 50 of the powder material according to the embodiment of the invention, and FIG. 3B shows powder particles 50 of powder material which are obtained by agitating and mixing the powder material without adding edible fats and oils to the powder material. As clearly shown in FIGS. 3A and 3B, the amount of the binder liquid on the bridge between two powder particles of the powder material shown in FIG. 3A is larger than that shown in FIG. 3B.

Next, constant amount of the agitated and mixed powder material with the edible fats and oils added thereto are continuously supplied into the granulation vessel 2 by the material feeder 8 through the conveyor 10 and the material dumping port 4. The supplied powder material is made to float by fluidized air and a fluidized bed of the powder material is formed uniformly in the premixing zone 18 of the granulation zone 2. Since the conical portion 12 becomes gradually broader toward its top end in the premixing zone 18, the powder material can be easily to be mixed and fluidized in the premixing zone 18. It should be noted that the uniform floating and adequate fluidizing of the powder material are important for maintaining the uniform quality of the granules of the powder material. The powder material is mixed in the premixing zone 18 for about 1–3 minutes.

Figure 4:
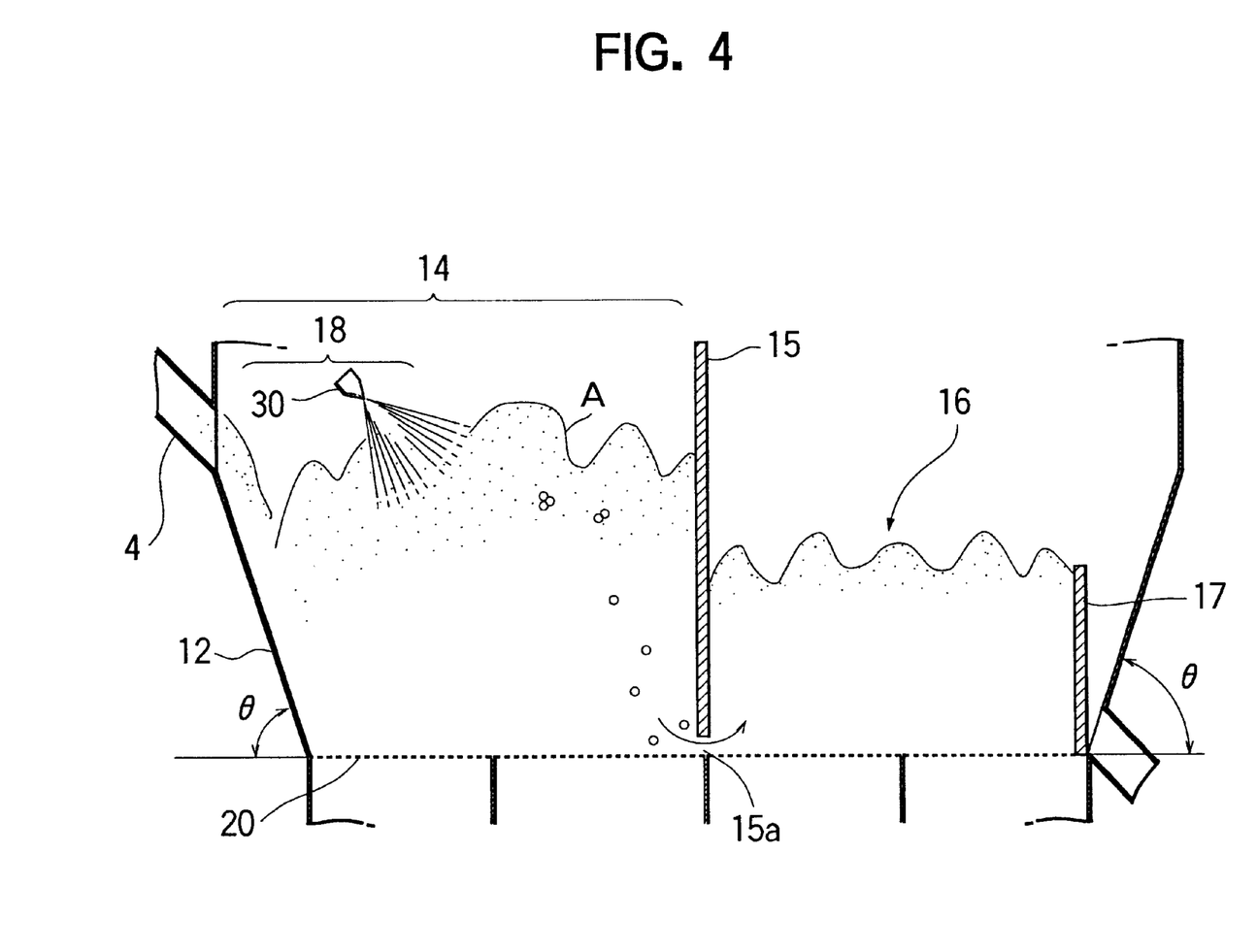
FIG. 4 is an enlarged sectional view of the apparatus shown in FIG. 1 for explaining a fluidized bed within a granulation vessel.

Referring to FIG. 4, a fluidized bed A of the powder material is formed by fluidized and heated air injected upwardly from the chambers 22 through the perforated plate 20. Since it is difficult for the perforated plate 20 to become logged and this plate 20 makes the air flow uniform, well fluidized powder material is continuously obtained and therefore the operation for continuously granulating the powder material can be carried out. Further, since the opening area of the conical portion 12 becomes gradually larger toward its top end because of the bath-tub type structure thereof, the velocity of the air flow is 1.8–2.5 meter/second when it passes through the perforated plate 20 and is decreased to 0.6–0.8 meter/second in the straight body portion 13. As a result, it is difficult for the perforated plate 20 to become clogged since the particles of the powder material move quickly near the perforated plate 20.

The temperature of the fluidized air is controlled to be 50–80° C. in the granulating zone 14 and 100–120° C. in the drying zone 16.

The fine binder is added into the fluidized bed A in a declined direction by the spray nozzle 30. The droplets of the binder adhere to the particles of the powder material and coagulation of the particles to each other occurs. As a result, granules which are porous and have a good instant characteristic are produced in the granulation zone 14. Since the binder is added into the fluidized bed A in the declined direction from the spray nozzle 30, the binder does not directly strike the perforated plate 20. Therefore, the perforated plate 20 does not become clogged and the operation for continuously granulating the powder material can be carried out. If granules having larger diameters are necessary to be produced, more amount of the binder is added to the powder material.

Figure 5A:
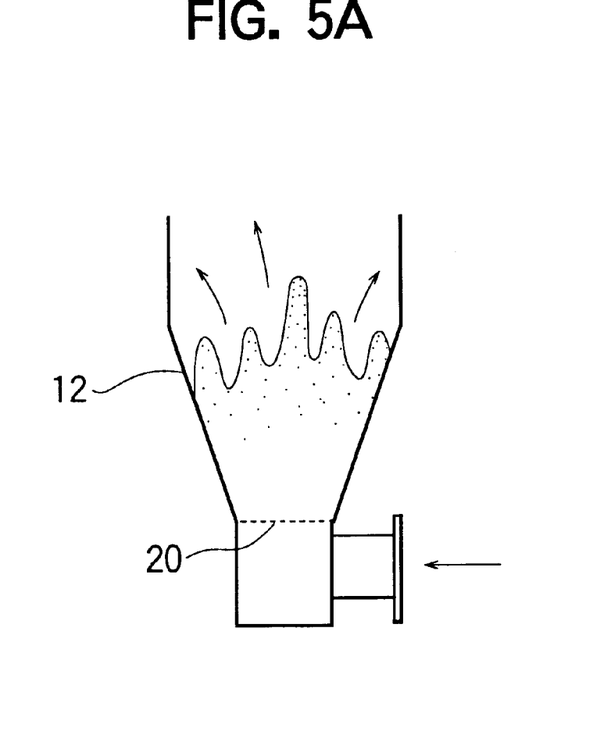
FIG. 5A is a sectional side view showing a granulation vessel whose side walls are inclined sharply.
Figure 5B:
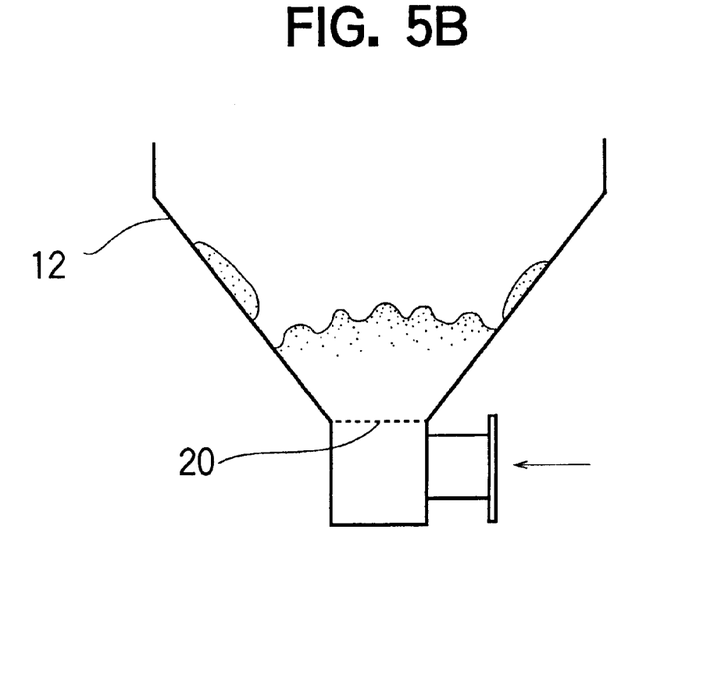
FIG. 5B is s sectional side view showing a granulation vessel whose side walls are inclined gently.

Since the conical portion 12 of the granulation vessel 2 has an opening area which becomes gradually larger toward its top end at an angle of 70 degrees (preferably about 60–80 degrees) from the horizontal direction, a good fluidized bed A is formed. If the side walls of the conical portion 12 is inclined at an sharp angle of more than 80 degrees as shown in FIG. 5A, the air velocity becomes higher than the desired velocity. As a result, the powder material is scattered and the powder material can not be kept in a well fuidized condition. On the other hand, if the side walls of the conical portion 12 are inclined at a gentle angle of less than 60 degrees as shown in FIG. 5B, the air velocity becomes slower than the desired velocity. As a result, the powder material adheres to the walls of the conical portion 12 and is thus not effectively mixed. Thus, according to the embodiment of the invention, the side walls of the conical portion 12 are inclined at the above-mentioned desired angle from the horizontal direction so as to provide a well fluidized bed A.

In the fluidized bed A in the granulation zone 14, the particles of the powder material are gradually coagulated to each other by the droplets of the binder adhering to the particles. Then, the granules, whose respective diameters become a predetermined value, fall and then move to the drying zone 16 through the space 15a which is formed between the intermediate weir 15 and the perforated plate 20 and has the predetermined height. At this time, the granules located in an upper portion of the fluidized bed A in the drying zone 16 overflow the upper end portion of the outlet weir 17 and then are discharged through the granule discharge port 6.

Namely, the powder material is continuously supplied to the granulation zone 14 and therefore the fluidized bed A is continuously formed, while the granulated powder material continuously overflows the outlet weir 17 in the drying zone 16. Further, as mentioned above, since the walls of the conical portion are inclined at the desired angle, the powder material is effectively mixed so as to obtain a uniform flow of the powder material in the granulation zone 14. As a result, the premixing zone 18, the granulation zone 14, the space 15a and the drying zone 16 acts as one system which generates a piston flow. Therefore, according to the embodiment of the invention, it is not necessary to provide the vibration mechanism used in the above-mentioned conventional apparatus.

Further, by adjusting the height of the space 15a between the intermediate weir 15 and the perforated plate 20, the non-granulated powder material having a diameter which is less than a predetermined value is prevented from moving from the granulation zone 14 to the drying zone 16 through the space 15a. As a result, only sufficiently granulated powder material can move from the granulation zone 14 to the drying zone 16.

Moreover, since the velocity of air flow passing through the perforated plate 20 in the drying zone 16 is 0.6–1.4 meter/second, which is relatively low, the granules of the powder material grown in the granulation zone 14 are dried without being destroyed. Thus, the granules respectively having an average diameter of 700–800 micrometers, 0.45–0.5 bulk density, 70–73 fluidity and a good instant characteristic can be obtained.

According to the embodiment of the present invention, since the edible fats and oils are added to the powder material in advance while the powder material is being agitated and mixed, the surfaces of the powder particles become hydrophobic and therefore the powder material or the starch material is prevented from rapidly getting wet by the binder liquid adhering to the material. As a result, granulation of hard namely not porous particles of the material is effectively prevented.

According to the embodiment of the invention, the supplied powder material is premixed in the premixing zone 18 within the granulation zone 14 to become uniformly fluidized.

According to the embodiment of the invention, the conical portion 12 of the granulation vessel 2 has a so-called bath-tub type structure so that side walls thereof are inclined at a predetermined angle and the granulation zone 14 has a strongly sprightly fluidized condition. As a result, the granules which are porous and have a good instant characteristics can be continuously produced by the well fluidized condition.

According to the embodiment of the invention, since the spray nozzle 30 is disposed to be declined at a predetermined angle, the binder liquid droplets do not directly strike on the perforated plate 20. As a result, the perforated plate 20 does not become clogged and therefore destruction of the fluidized condition of the fluidized bed can be prevented.

According to the embodiment of the invention, since the perforated plate 20 is made out of a stainless punching plate, the continuously steady well fluidized condition of the fluidized bed can be kept.

When putting to the granulated product produced by the above-mentioned method of the invention in a cup and then adding the boiled water into the cup, the granulated product is immediately dispersed and solved into the boiled water with no lumps.

Next, another embodiment of the present invention will be explained with reference to FIG. 6.

In the above mentioned embodiment shown in FIG. 1, the edible fats and oils are added to the powder material in advance while the powder material is being agitated and mixed in the mixer (not shown) which is located upstream from the material feeder 8. On the other hand, according to the another embodiment shown in FIG. 6, instead of edible fats and oils being added to the powder material while the powder material is being agitated and mixed in the mixer, the edible fats and oils may be added from the upper portion of the premixing zone 18 of the vessel 2 to be mixed with the powder material.

Figure 6:
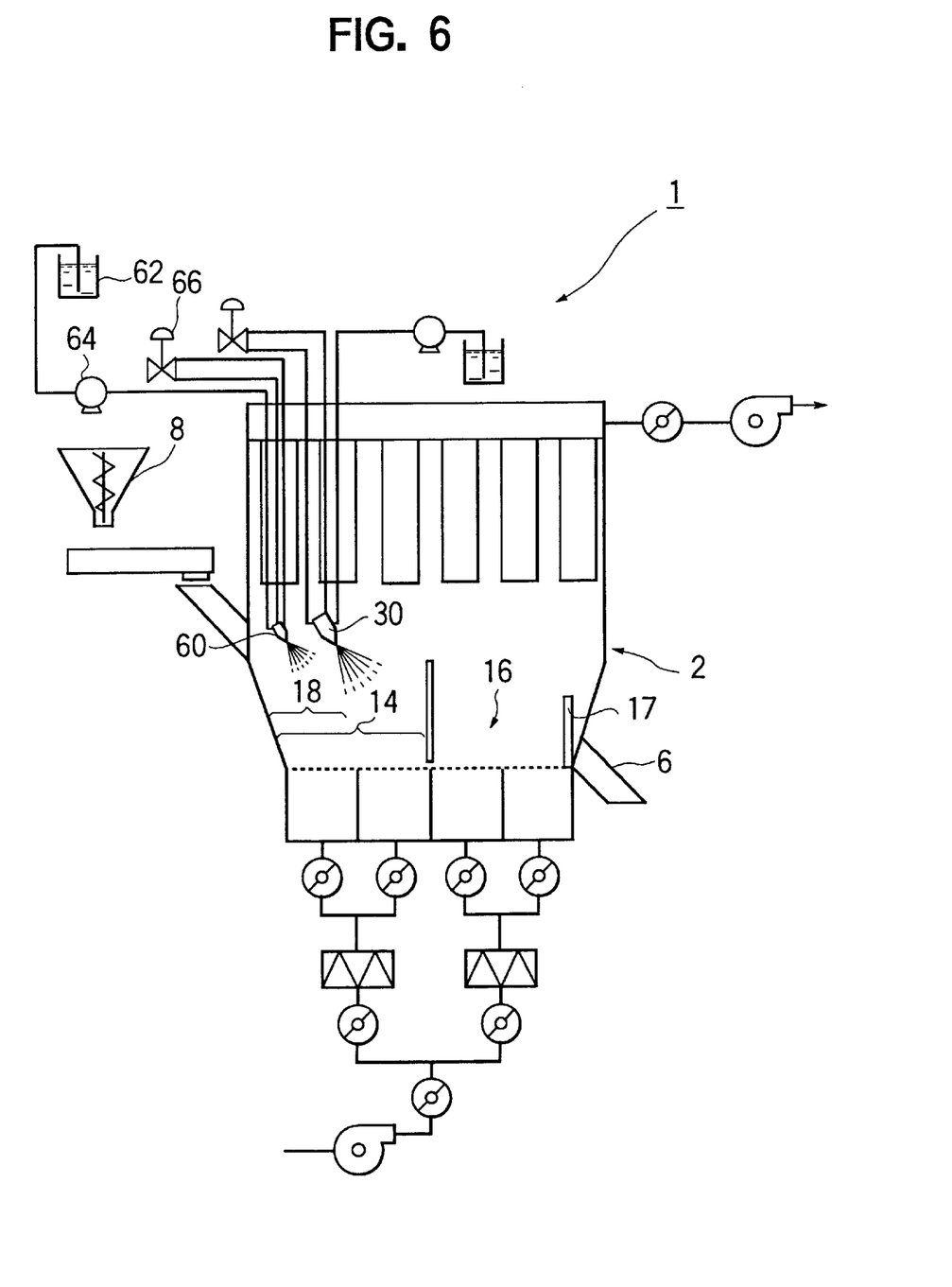
FIG. 6 is a sectional front view of an apparatus for continuously granulating powder material according to another embodiment of the present invention.

Referring to FIG. 6, a spray nozzle 60 is disposed on the upper portion of the premixing zone 18 to be declined at an angle of preferably about 30 degrees from the vertical direction. The spray nozzle 60 may be disposed vertically toward below. Namely, the spray nozzle 60 may be disposed at an angle of about 0–30 degrees from the vertical direction. The edible fats and oils are stored in a liquid vessel 62 disposed outside of the granulation vessel 2. The edible fats and oils are supplied to the spray nozzle 60 from the liquid vessel 62 through the pump 64. Mist air is also supplied to the spray nozzle 60 from a compressed air source (not shown) through a pressure reducing valve 66. The edible fats and oils are made fine by the spray nozzle 60 and then are to the powder material in the premixing zone 18 and mixed therewith.

According to the another embodiment of the invention, since the edible fats and oils are added to the powder material in the premixing zone 18 and mixed therewith, advantageous effects as same as those of the embodiment shown in FIG. 1 can be obtained.

According to the present invention, the intermediate weir 15 may be removed and the whole of the granulation vessel 2 may be used as a granulation zone. In this embodiment, a plurality of spray nozzles for supplying binder may be installed in the granulation vessel. Further, in this embodiment, an independent drying apparatus (not shown) is disposed at the outlet side of the granulation vessel 2. As a result, much more powder material can be granulated in the granulation vessel 2 than in the case of the above-mentioned embodiment.

While the present invention has been illustrated by means of several preferred embodiments, one of ordinary skill in the art will recognize that modifications and improvements can be made while remaining within the spirit and scope of the invention. The scope of the invention is determined solely by the appended claims.

What is claimed is:

1. An apparatus for continuously granulating power material comprising:

feeder means for continuously supplying powder material;

a granulation vessel including a granulation zone in which the continuously supplied powder material is granulated, and a drying zone in which the granulated material is dried, said granulation vessel having side walls which are inclined at a predetermined angle so that an opening area thereof becomes larger toward its top end;

a spray nozzle disposed above the granulation zone for adding binder to the powder material;

a perforated plate disposed below the granulation zone and the drying zone, the perforated plate having a predetermined opening ratio;

an intermediate weir disposed substantially vertically between the granulation zone and the drying zone so as to provide a space having a predetermined height between the intermediate weir and the perforated plate;

an outlet weir disposed at an outlet side of the drying zone, the outlet weir having a predetermined height the dried granulated material overflows; and heated air supplying means for supplying from below heated air having a predetermined temperature to the granulation zone and the drying zone so as to form a fluidized bed of the material.

2. An apparatus for continuously granulating powder material according to claim 1, wherein said apparatus further comprises fats and oils adding means for adding edible fats and oils to the powder material in the granulating zone or an upstream side before the granulating zone.

3. An apparatus for continuously granulating powder material according to claim 1, wherein said predetermined angle of the granulation vessel is about 60–80 degrees from a horizontal direction.

4. An apparatus for continuously granulating powder material according to claim 1, wherein said granulation vessel includes a premixing zone for mixing the powder material in the upstream side within the granulation zone.

5. An apparatus for continuously granulating powder material according to claim 1, wherein said predetermined height in the intermediate weir is about 10–50 millimeters.

6. An apparatus for continuously granulating powder material according to claim 1, wherein said perforated plate is a punching plate.

7. An apparatus for continuously granulating powder material according to claim 1, wherein said spray nozzle is disposed vertically toward below or so as to be declined at a predetermined angle.

8. An apparatus for continuously granulating powder material according to claim 7, wherein said spray nozzle is disposed at an angle of about 0–30 degrees from a vertical direction.

* * * * *